United States Patent
Lin

(10) Patent No.: US 7,078,915 B1
(45) Date of Patent: Jul. 18, 2006

(54) ANGULAR POSITION SENSOR FOR ROTATING COMPONENTS SUCH AS STEERING COLUMNS

(75) Inventor: Yingjie Lin, El Paso, TX (US)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 11/063,319

(22) Filed: Feb. 22, 2005

(51) Int. Cl.
*G01R 27/26* (2006.01)

(52) U.S. Cl. .................... 324/660; 324/662
(58) Field of Classification Search ........ 324/658, 324/662, 660
See application file for complete search history.

(56) References Cited

U.S. PATENT DOCUMENTS

| | | | | |
|---|---|---|---|---|
| 4,998,103 A * | 3/1991 | Rosswurm et al. .... | 340/870.37 |
| 5,077,635 A * | 12/1991 | Bollhagen et al. .......... | 361/287 |
| 5,172,039 A * | 12/1992 | Owens ....................... | 318/489 |
| 5,239,307 A * | 8/1993 | Andermo ............... | 340/870.37 |
| 5,598,153 A * | 1/1997 | Brasseur et al. ....... | 340/870.37 |
| 5,910,781 A * | 6/1999 | Kawamoto et al. .... | 340/870.37 |
| 6,218,803 B1 * | 4/2001 | Montagu et al. ............ | 318/662 |
| 6,492,911 B1 * | 12/2002 | Netzer .................... | 340/870.37 |
| 2005/0189952 A1 * | 9/2005 | Ejima et al. ................. | 324/662 |
| 2006/0028215 A1 * | 2/2006 | Berting et al. .............. | 324/662 |

* cited by examiner

*Primary Examiner*—Anjan Deb
(74) *Attorney, Agent, or Firm*—Jimmy L. Funke

(57) ABSTRACT

A semi-circular dielectric rotor is attached to a steering column for rotation with the steering column. Straddling the rotor but not contacting it are an excitation electrode member which generates an electric field and a receiver electrode member that outputs signals representative of the electric field and, hence, of the position of the steering column.

3 Claims, 4 Drawing Sheets

ANGULAR POSITION SENSOR FOR ROTATING COMPONENTS SUCH AS STEERING COLUMNS

I. TECHNICAL FIELD

The present invention relates to angular position sensors for vehicles.

II. BACKGROUND OF THE INVENTION

Modern motor vehicles are equipped with numerous vehicle subsystems that are designed to increase the comfort and safety of drivers and passengers. For example, a vehicle can include an anti-lock braking system, a traction control system, a speed control system, and/or a vehicle stability enhancement control system. In turn, each subsystem can include numerous electrically-operated hydraulic actuators that use electric coils to move plungers and thereby direct hydraulic fluid to and from vehicle components such as a brake.

As recognized herein, some control systems such as chassis stability control systems use, as one input parameter, the angular position of the steering column. Accordingly, sensors have been developed to generate signals representative of the position of the steering column for input to, e.g., a control processor such as an engine control module (ECM). As further recognized herein, these sensors typically are embodied by resistance contact sensors in which an electrode on the moving part (steering column) wipes against a stationary electrode. The present invention understands that while such sensors effectively output angular position signals, owing to the required contact between electrodes, they can wear out, requiring replacement. Accordingly, the present invention seeks to provide a non-contact angular position sensor that can replace a contact-based sensor in systems such as steering column angular position detecting systems.

SUMMARY OF THE INVENTION

A system for outputting signals representative of an angular position includes a vehicle steering column and a dielectric rotor coupled to the steering column such that the rotor rotates with the steering column. In this aspect of the invention, the rotor can define opposed semicircularly-shaped first and second surfaces, i.e., the rotor can form one-half of a disk. A non-rotating excitation electrode member that may contain four electrodes is closely spaced from the first surface of the rotor and does not contact the rotor. A non-rotating receiver electrode member is also closely spaced from the rotor but on the side of the second surface of the rotor. Like the excitation electrode member, the receiver electrode member does not contact the rotor. An electrical circuit supplies excitation signals to the excitation electrode member and receives signals from the receiver electrode member. The signals from the receiver electrode member are useful in determining an angular position of the steering column.

In non-limiting embodiments of this first aspect the receiver electrode member includes an inner annular shielding ground element, an outer annular shielding ground element, and a receiver electrode therebetween. One or both electrode members can be established by a printed circuit board (PCB).

As set forth further below, the non-limiting circuit may develop two time-varying cyclic excitation signals that are one hundred eighty degrees out of phase with each other. The frequency of excitation may be between ten thousand Hertz and several million (e.g., two million) Hertz inclusive. Also, the circuit may include at least one select switch operating at a frequency lower than an excitation frequency.

In some implementations the switch can have a first configuration, in which first and second excitation electrodes are connected together to establish a first capacitance relative to the receiver electrode member and third and fourth excitation electrodes are connected together to establish a second capacitance relative to the receiver electrode member. The difference between the first and second capacitances is representative of the angular position of the rotor. The switch can be configured in a second configuration, in which the first and fourth excitation electrodes are connected together to establish a third capacitance relative to the receiver electrode member and the second and third excitation electrodes are connected together to establish a fourth capacitance relative to the receiver electrode member. The difference between the third and fourth capacitances is representative of the angular position of the rotor.

In another aspect, a device for outputting signals representative of an angular position of a rotating component includes an excitation electrode member, a receiver electrode member, and a rotor sandwiched between the electrode members and not touching the electrode members. The rotor can be coupled to the rotating member for rotation therewith past the electrode members.

In still another aspect, a system includes a rotatable vehicle steering column and capacitance altering means rotating with the steering column for altering at least one capacitance as the steering column rotates. The system also includes excitation means receiving excitation current for generating the electric field. Receiver means are provided for outputting signals representing the angular position of the steering column. The capacitance altering means is straddled by but is not physically contacted by the excitation means and the receiver means.

The present invention will now be described, by way of example, with reference to the accompanying drawings, in which:

BRIEF DESCRIPTION OF THE DRAWINGS

FIG. 1 is a simplified perspective view of the angular position sensor, with portions of the vehicle removed for clarity;

FIG. 2 is a top view of the sensor;

FIG. 3 is a top view of the sensor with the excitation electrodes removed;

FIG. 4 is an electrical block diagram of one non-limiting signal processing circuit; and FIG. 5 is a graph of the signals output by a non-limiting embodiment of the sensor, juxtaposed with schematic plan views showing differing positions of the rotor.

DESCRIPTION OF AN EMBODIMENT OF THE INVENTION

Referring initially to FIG. 1, an angular position sensing system is shown, generally designated 10, which can be used to sense the angular position of a rotating component 12, such as the steering column of a vehicle. As will be more fully disclosed below, signals generating by the sensing elements of the system 10 are sent to an analog or digital processing circuit 14, which in turn can send angular position signals to a digital processor 16 such as a vehicle engine control module (ECM). Using the angular position signals, the processor 16 can develop and send control signals to one or more vehicle control systems 18. For example, the angular position of the steering column of a vehicle can be used as an input parameter to a chassis control system or other vehicle system, e.g., stability control, transmission control applications, etc. The angular positions of other vehicle rotating components (such as, e.g., the crankshaft, accelerator pedal, and brake pedal) may also be sensed using the system 10 and principles advanced herein to control other vehicle subsystems including, e.g., electric throttle control and electric braking systems (EBS).

Figure 1:
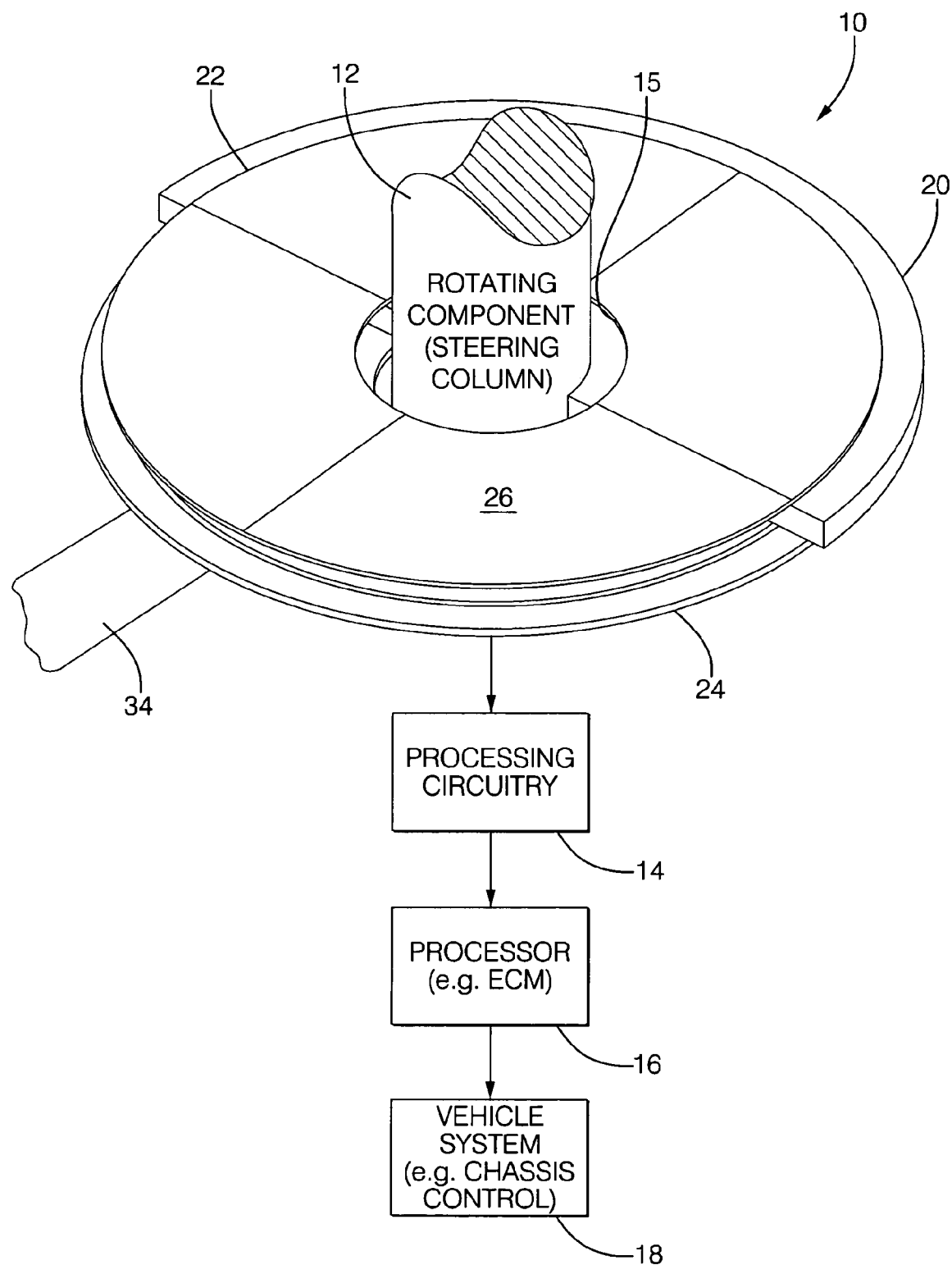
Figure 3:
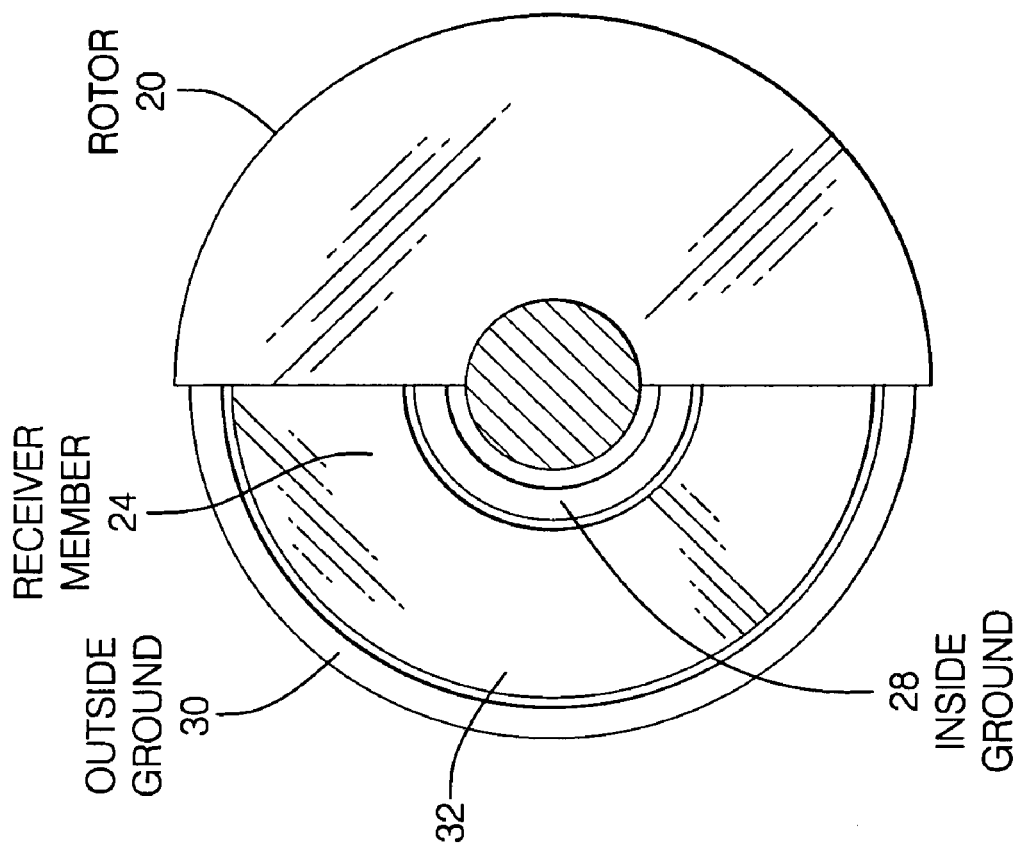
Figure 2:
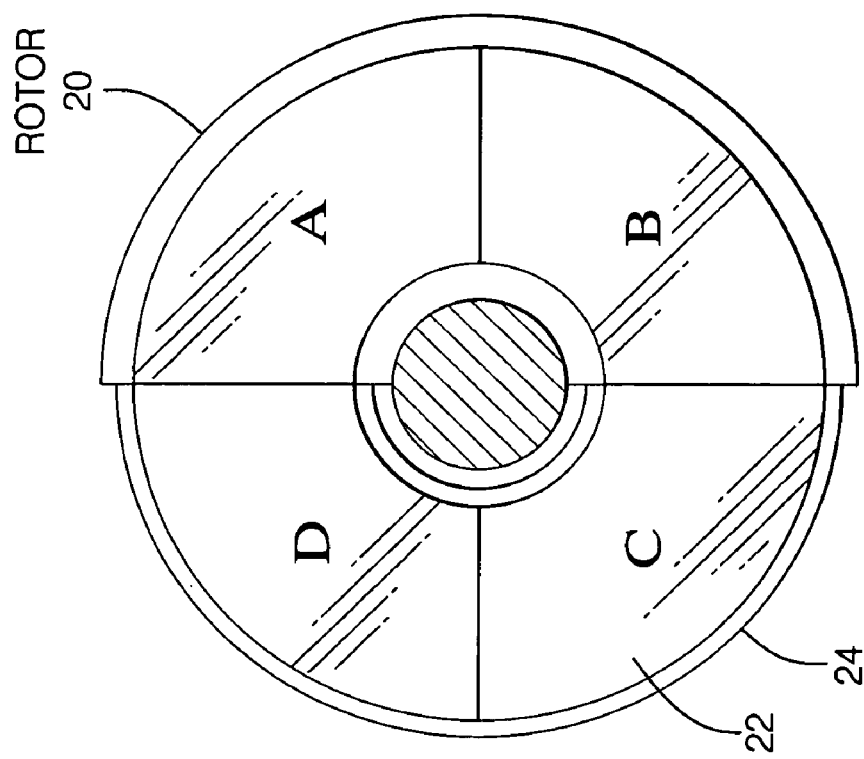

With the above principles in mind, attention is directed to FIGS. 1–3 for an understanding of the mechanical components of the system 10. As shown, a rotor 20 is coupled to the rotating component 12 by a coupling 15, so that the rotor rotates with the rotating component 12. The coupling 15 may be any appropriate coupling, including an inside diameter of the rotor 20. In general, the rotor 20 may be keyed, glued, fastened, sonic welded, rf sealed, heat staked, molded, or otherwise attached to the rotating component 12.

In the preferred embodiment shown, the rotor 20 is disk-shaped, in that it forms a portion of a complete disk but not a 100% portion. Specifically, the periphery of the rotor 20 does not encompass 360 degrees, but rather something less. In the embodiment shown, the rotor 20 forms one-half of a complete disk with a central annular portion removed to receive the rotating component 12 therein, in which case the opposed surfaces of the rotor 20 are semi-circular. The rotor 20 is made of a dielectric material, e.g., hard rigid plastic.

FIGS. 1–3 show that the rotor 20 is sandwiched between two stationary members, specifically, the rotor 20 is sandwiched between an excitation electrode member 22 and a receiver electrode member 24. The electrode members 22, 24 thus straddle the rotor 20.

The excitation electrode member 22 may have plural (e.g., four) preferably identically-sized and shaped wedge-shaped electrodes 26, labeled "A"–"D" in FIG. 2. On the other hand, as best shown in FIG. 3 the receiver electrode member may have annular-shaped inner and outer shielding ground elements 28, 30 both connected to ground and separated by an annular-shaped receiver electrode 32. Small air gaps separate the rotor 20 from the electrode members 22, 24 so that the electrode members 22, 24 do not contact the rotor 20. It is preferable that the plates of the excitation electrode member 22, receiver electrode 24, and rotor 20 are parallel to each other.

In non-limiting embodiments the electrode members 22, 24 may be implemented by one or more printed circuit boards (PCBs) that are affixed to a non-rotating component of the vehicle such as but not limited to a collar or bearing housing surrounding the steering column, schematically shown at reference numeral 34 in FIG. 1. When the electrode members 22, 24 are implemented in a PCB, the shielding ground elements 28, 30 can be implemented by portions of the PCB other than the portions implementing the receiver electrode 32. A double-sided PCB may be used to implement the electrode members 22, 24. It is preferable that the electrodes 26, 32 and the shielding ground elements 28, 30 are disposed on the inner side of the electrode PCB (the sides facing the rotor 20) and the outer sides of the PCBs are preferably fully covered by ground plates (not shown) for shielding.

The capacitance differences discussed herein are due to different orientations of the electrodes A–D relative to the receiver electrode 24, and hence are functions of rotor angular position. The capacitance differences are thus used as set forth further below to determine (sense) the angular position of the rotating component 12.

Figure 4:
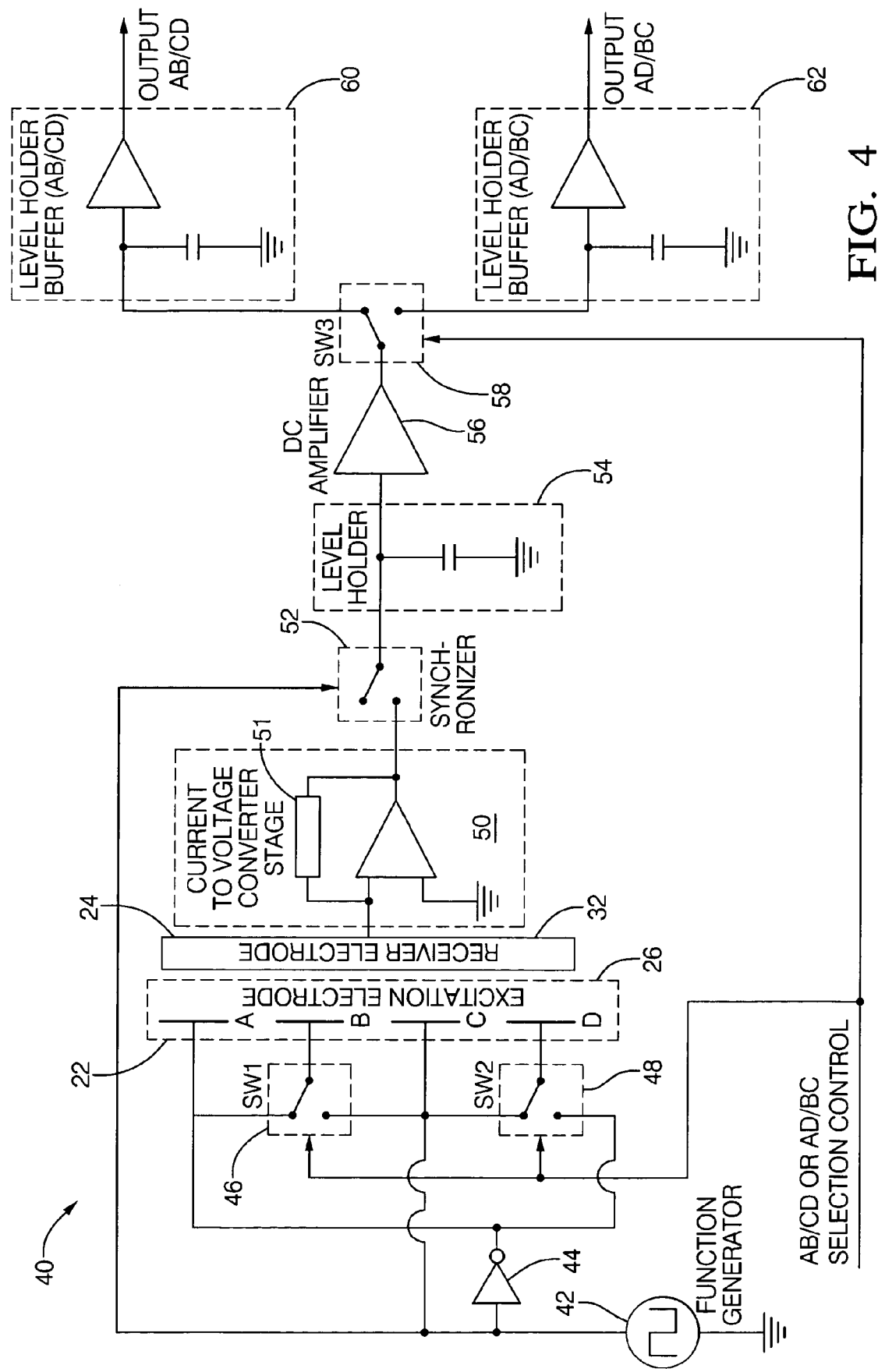

FIG. 4 is but one example of a circuit that can be used to measure the capacitance differences. Now referring to FIG. 4, an exemplary non-limiting embodiment of the circuit 14 shown in FIG. 1 is illustrated and generally designated 40. As shown, the circuit 40 includes a function generator 42 that generates an input cyclic time-varying square wave excitation signal. The frequency of the excitation signal may be between ten thousand Hertz and several million Hertz inclusive, and it can be sent to the excitation electrodes 26, "A"–"D" through parallel lines, one of which contains an analog NOT component 44, so that two excitation signals are developed that are with the same amplitude but 180° out of phase with each other as set forth further below.

More specifically, the signals from the parallel lines are selectively imposed on the electrodes "A"–"D" of the excitation electrode 26 through first and second select switches 46, 48. In the switch configuration shown, the excitation electrodes "A" and "B" are the potential of the output of the NOT component 44 (i.e., one hundred eighty degrees out of phase with the function generator), whereas the electrodes "D" and "C" are at the potential of the function generator. In the opposite switch configuration, it can be appreciated that the electrodes "A" and "D" are at the inverted potential and the electrodes "C" and "B" are at the non-inverted potential. The two different switch configurations are indicated as AB/CD and AD/BC, respectively.

The signal picked up by the receiver electrode 32 through the rotor 20 (not shown in FIG. 4) is sent to a current-to-voltage converter 50 to convert the signal to a voltage. For a square wave excitation signal generated by the function generator 42 and capacitance feedback 51, the voltage output from the converter 50 is also a square wave, the amplitude of which is proportional to the capacitance difference. From the converter 50 the voltage signal is passed to a synchronizer switch 52. The synchronizer switch 52, which is moved between its two positions shown at the frequency of the excitation signal, cooperates with a level hold detector 54 to hold the amplitude of the detected signal from the receiver electrode 32. This signal is sent through a DC amplifier 56 to a third select switch 58. The select switches 46, 48, 58 move in synchronization with each other preferably at a frequency that is lower than that of the excitation signal and more preferably at a frequency that is less than about one-tenth of the excitation frequency.

In the position of the third select switch 58 shown in FIG. 4, the signal is sent to an AB/CD level holder output buffer 60, for provision to, e.g., the processor 16 shown in FIG. 1. In contrast, in the position of the third select switch 58 that is opposite to the one shown in FIG. 4, the signal is sent to an AD/BC level holder output buffer 62.

Figure 5:
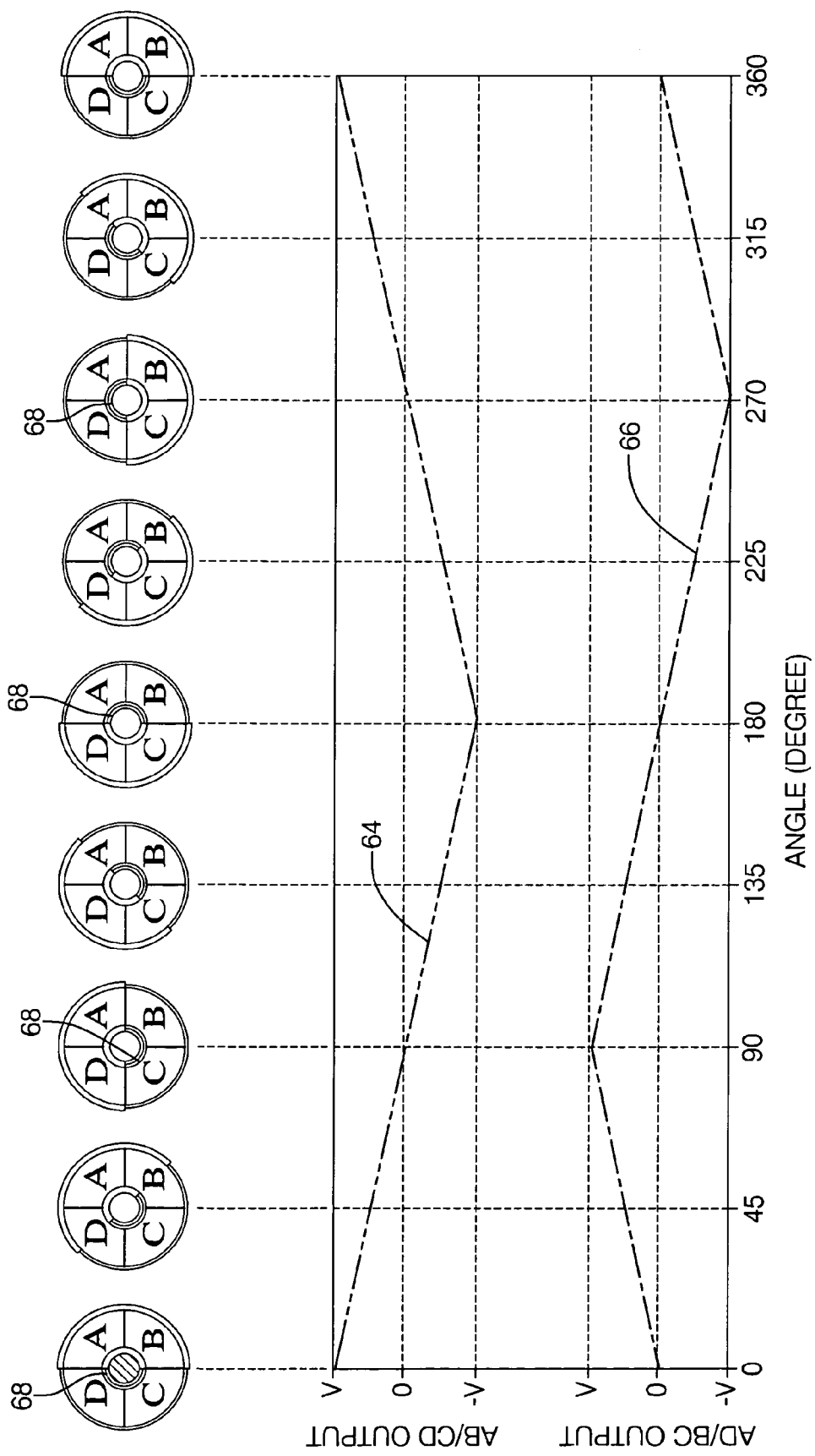

The results of the above switching in the circuit 40 can be seen in FIG. 5, which shows, for various positions of the rotor 20, the AB/CD signal 64 from the AB/CD level holder output buffer 60 and the AD/BC signal 66 from the AD/BC level holder output buffer 62. The position of the rotor 20 is indicated in the various plan views by the white band 68.

In explanation, taking the left-most position shown in FIG. 5, which can be considered to be the zero degree (no rotation from normal) position, in one configuration of the select switches 46, 48, 56 shown in FIG. 4, electrodes "A" and "B" are connected together to the negative phase excitation signal whereas electrodes "C" and "D" are connected to the positive phase. Because the rotor 20 is completely interposed between the electrodes "A" and "B" and the receiver electrode 32, the capacitance between the electrodes "A" with "B" to the receiver electrode 32 is at a maximum. However, because no part of the rotor 20 is between the receiver electrode 32 and the electrodes "C" and "D" in the zero degree position, the capacitance between the receiver electrode 32 and the "C" with "D" combination is at a minimum. At this position, the difference between the two capacitances, i.e., "A with B" to receiver electrode 32 and "C with D" to receiver electrode 32 is maximum, making the output of the AB/CD switch configuration maximum. In the same rotor position but opposite select switch configuration, electrodes "A" and "D" are connected to the negative phase excitation signal and electrodes "B" and "C" are connected to the positive phase signal, with the rotor 20 being as much interposed between "A" and "D" as it is interposed between "B" and "C" and, hence, with the electrodes "in balance" and the resulting output (AD/BC) signal equal to zero.

It may now be appreciated that the signals 64, 66 form triangular shapes as the rotor 20 turns through a complete revolution, and furthermore that the sum of the absolute values of the signals 64, 66 remains constant, which, as understood herein, is useful for compensating for temperature variations. In any case, from FIG. 5 the values of the signals 64, 66 can be correlated at any point to the angular position of the rotor 20 (and, hence, to the angular position of the rotating component to which it is coupled). Furthermore, the time derivatives of the position signals can be obtained in accordance with principles well known in the art to obtain angular velocity.

While the particular ANGULAR POSITION SENSOR FOR ROTATING COMPONENTS SUCH AS STEERING COLUMNS as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A system for outputting signals representative of an angular position, comprising:
   a vehicle steering column;
   a rotor made of dielectric material and coupled to the steering column such that the rotor rotates with the steering column, the rotor defining opposed semicircularly-shaped first and second surfaces;
   an excitation electrode member closely spaced from the first surface of the rotor and not contacting the rotor, the excitation electrode member not rotating when the rotor rotates, the excitation electrode member including plural excitation electrodes;
   a receiver electrode member closely spaced from the second surface of the rotor and not contacting the rotor, the receiver electrode member not rotating when the rotor rotates;
   a circuit, wherein the circuit includes at least one select switch operating at a frequency lower than an excitation frequency, supplying excitation signals to the excitation electrode member and receiving signals from the receiver electrode member, the signals from the receiver electrode member being useful in determining an angular position of the steering column; and
   wherein the switch has a first configuration in which first and second excitation electrodes are connected together to establish a first capacitance relative to the receiver electrode member and third and fourth excitation electrodes are connected together to establish a second capacitance relative to the receiver electrode member, a difference between the first and second capacitances being representative of the angular position of the rotor, the switch being configurable in a second configuration in which the first and fourth excitation electrodes are connected together to establish a third capacitance relative to the receiver electrode member and the second and third excitation electrodes are connected together to establish a fourth capacitance relative to the receiver electrode member, a difference between the third and fourth capacitances being representative of the angular position of the rotor.

2. A device for outputting signals representative of an angular position of a rotating component, comprising:
   at least one excitation electrode member;
   at least one receiver electrode member;
   at least one rotor sandwiched between the electrode members and not touching the electrode members, the rotor being couplable to the rotating member for rotation therewith past the electrode members; and
   a switch having a first configuration in which first and second excitation electrodes are connected together to establish a first capacitance relative to the receiver electrode member and third and fourth excitation electrodes are connected together to establish a second capacitance relative to the receiver electrode member, a difference between the first and second capacitances being representative of the angular position of the rotor, the switch being configurable in a second configuration in which the first and fourth excitation electrodes are connected together to establish a third capacitance relative to the receiver electrode member and the second and third excitation electrodes are connected together to establish a fourth capacitance relative to the receiver electrode member, a difference between the third and fourth capacitances being representative of the angular position of the rotor.

3. A system, comprising:
   a rotatable vehicle steering column;
   capacitance altering means rotating with the steering column for altering at least one capacitance as the steering column rotates, wherein the capacitance altering means includes at least one disk-shaped dielectric rotor;
   excitation means receiving excitation current for generating the electric field, wherein the excitation means includes at least one excitation electrode member having plural wedge-shaped excitation electrodes;

receiver means for outputting signals representing the angular position of the steering column, the capacitance altering means being straddled but not physically contacted by the excitation means and the receiver means, wherein the receiver means includes at least one receiver electrode member having an inner annular shielding ground element, an outer annular shielding ground element, and a receiver electrode therebetween; and a switch having a first configuration in which first and second excitation electrodes are connected together to establish a first capacitance relative to the receiver electrode member and third and fourth excitation electrodes are connected together to establish a second capacitance relative to the receiver electrode member, a difference between the first and second capacitances being representative of the angular position of the rotor, the switch being configurable in a second configuration in which the first and fourth excitation electrodes are connected together to establish a third capacitance relative to the receiver electrode member and the second and third excitation electrodes are connected together to establish a fourth capacitance relative to the receiver electrode member, a difference between the third and fourth capacitances being representative of the angular position of the rotor.

* * * * *